United States Patent Office 3,228,909
Patented Jan. 11, 1966

3,228,909
POLYOXYMETHYLENE POLYMER STABILIZED
WITH SULFUR
Nino Oddo, Milan, Italy, assignor to Montecatini Società
Generale per l'Industria Mineraria e Chimica, a corporation of Italy
No Drawing. Filed Jan. 26, 1962, Ser. No. 169,086
Claims priority, application Italy, Jan. 30, 1961,
1,525/61
7 Claims. (Cl. 260—45.7)

The present invention relates to formaldehyde polymers having a high molecular weight and more particularly to the stabilization of such polymers by the addition of a protective substance.

It is known that polyoxymethylenes exhibit high thermal degradation. Thus, at temperatures equal to or in excess of their melting point they depolymerize to again produce the monomer.

The depolymerization of polyoxymethylenes appears to occur through three different mechanisms:

(1) Depolymerization commencing with the terminal —OH groups of the chain, with the elimination of $CH_2O$;
(2) Oxygen attack of the methylene groups of the polymer, with the formation of peroxide groups, followed by scission or rupture of the acetal bonds of the chain;
(3) Acid attack of the C—O—C— bonds of the chain by hydrogen ions.

In order to improve the thermal stability of polyoxymethylenes and to permit their usage in various practical applications, it is necessary to stabilize the terminal —OH groups of the chain; thus, the terminal —OH groups are blocked by reaction with less labile chemical groups.

The techniques used for this purpose may vary, e.g., esterification, introduction of acyl groups, etc.

The products thus obtained, however, do not present a sufficiently high thermal stability. This is because the depolymerization mechanisms of types (2) and (3) are in fact still possible.

For a further stabilization of polyoxymethylenes, various organic substances have been proposed, such as hydrazines, sulfonamides, amides, aromatic amines, phenols, urea, thiourea and substituted derivatives thereof.

I have surprisingly found that if a polyoxymethylene is admixed with elemental sulfur, the stability characteristics of the polymers at high temperatures are decidedly improved.

This new type of additive is more effective, even when present in very low concentrations, than the aforementioned additives. Sulfur can be incorporated in the polymer using any of the known techniques for uniformly dispersing a powdered solid in a polymer. The operation can be carried out at room temperature in a mixer for powders, or at a temperature higher than the melting point of the polymer in a roll mixer or in a screw-extruder.

Another technique involves dissolving sulfur in a suitable solvent, impregnating the polymer with the solution obtained, and then drying the polymer.

According to the present invention, sulfur is added to the polymer in an amount not higher than about 15% by weight of the polymer and not lower than about 0.001% by weight of the polymer. A more preferred range is from about 0.01% to 10% by weight.

The polyoxymethylene compositions can also contain plasticizers, antioxidants, and other stabilizers, such as stabilizers used to prevent degradation caused by ultraviolet rays.

The thermal degradation of polymers stabilized with sulfur was determined by placing about 0.1 gram of product in an oven maintained at 200° C., in the presence of air, and measuring the weight loss of the sample after 30 minutes and then after 60 minutes.

The results of these tests are expressed by indicating as $K'_{200}$ the percent weight loss after 30 minutes, and as $K''_{200}$ the corresponding loss after 60 minutes.

Viscosity determinations were carried out on solutions of polymer in dimethylformamide with a concentration of 0.5 g./100 cc. at a temperature of 150° C. in the presence of diphenylamine (1 g./100 cc.). I have found that the optimum results of my invention are obtained when the initial inherent viscosity of the polymer is in excess of 0.4.

The results of these determinations are expressed as inherent viscosity, which is defined as follows:

$$\text{Inherent viscosity} = \frac{\ln \text{relative viscosity}}{C}$$

wherein the relative viscosity is the ratio of the viscosity of the solution to the viscosity of the solvent and wherein C is the concentration of the solute in g./100 cc.

It cannot, at present, be explained how sulfur exerts its protective action. More contemporaneous mechanisms presumably occur. The tendency of sulfur to pass to oxidized form having a higher valency can protect the polymeric chain from the peroxidizing action of atmospheric $O_2$. Moreover, in case of thermal or chemical breaking of the acetal bonds of polyoxymethylenes, sulfur could bind itself with the chain ends thus avoiding depolymerization.

It has in fact been noted that sulfur reduces both the weight loss at high temperature and the decrease in the molecular weight of the polymer due to thermal treatment. In particular, this second action is of a fundamental importance because, in a polymer in which the chain ends are stabilized, chain scissions or ruptures at high temperature lead to the formation of new weak sites from which a very rapid depolymerization starts. It is obvious that, by blocking these isolated breakings of the chains, both the monomer loss due to depolymerization and the decrease in the molecular weight are blocked.

Examples and data relating to the decrease in weight and inherent viscosity after thermal treatment is reported for polyoxymethylenes with free terminal —OH (Table 1) and with terminal —OH esterified with acetic anhydride (Table 2). In these tables the products stablized with sulfur are compared with products stablized with other common stabilizers.

The following examples will further illustrate our invention without limiting its scope.

Table 1

[Polyoxymethylenedihydroxide—Inherent viscosity=0.85]

| | Weight loss at 200° C. | | Inherent viscosity after 30 minutes at 200° C. |
|---|---|---|---|
| | $K'_{200}\%$ | $K''_{200}\%$ | |
| Polymer Control (without stabilizer) | 84 | 92 | 0.15 |
| Polymer+BB([1]) (2%) | 80 | 95 | 0.11 |
| Polymer+DFA ([2]) (2%) | 70 | 88 | 0.30 |
| Polymer+BB (2%)+S (0.5%) | 50 | 60 | 0.50 |
| Polymer+DFA (2%)+S (0.5%) | 30 | 49 | 0.55 |
| Polymer+S (0.5%) | 38 | 60 | 0.50 |

[1] BB=4,4'-butylidene-bis (6-tertiary butyl-3-methylphenol).
[2] DFA=Diphenylamine.

Table 2

[Polyoxymethylene diacetate—Inherent viscosity=0.80]

|  | $K'_{200}\%$ | $K''_{200}\%$ | Inherent viscosity after 30 minutes at 200° C |
|---|---|---|---|
| Polymer Control | 54 | 90 | 0.12 |
| Polymer+DFA [1] (0.5%) | 4 | 10 | 0.45 |
| Polymer+BB [2] (0.5%) | 4 | 9 | 0.35 |
| Polymer+BB(0.5%)+S (0.5%) | 2.6 | 3.6 | 0.60 |
| Polymer DFA (0.5%)+S (0.5%) | 2.8 | 3.5 | 0.65 |
| Polymer+S (0.5%) | 2.3 | 3.5 | 0.66 |

[1] DFA=Diphenylamine.
[2] BB=4,4'butylidene-bis(6-tertiary butyl-3-methylphenol).

EXAMPLE 1

A polyoxymethylene dihydroxide was prepared by polymerization of anhydrous $CH_2O$ in an anhydrous aliphatic hydrocarbon solvent (heptane). The synthesis was carried out at room temperature, in the presence of an aminic catalyst (pyridine), feeding gradually the gaseous monomer. A sample of the polymer thus obtained, after washing and drying, was mixed intimately with an amount of solid very fine sulfur corresponding to 0.5% by weight of the polymer.

The operation was carried out by mixing the two powders in a ball mixer for 30 minutes. The inherent viscosity of polyoxymethylene dihydroxide before and after the treatment in the ball mill, was 0.85. The sample was then subjected, according to the previously described procedure, to thermal treatment at 200° C.

The results are reported in Table 3.

Table 3

|  | $K'_{200}\%$ | $K''_{200}\%$ | Inherent viscosity after 30 minutes at 200° C |
|---|---|---|---|
| Polymer control | 84 | 92 | 0.15 |
| Polymer+0.5% of S | 38 | 60 | 0.50 |

EXAMPLE 2

A polyoxymethylene dihydroxide, prepared as described in Example 1, was acetylated in the presence of acetic anhydride and sodium acetate. The polyoxymethylene diacetate thus obtained was treated with a solution of colloidal sulfur in carbon disulfide. An amount of solution was used so as to contain 0.5% of sulfur based on the weight of the polymer so treated.

Carbon disulfide was then evaporated by maintaining the sample at 65° C. under vacuum for 4 hours.

To other samples of the same polyoxymethylene diacetate, the antioxidants reported in the following table were added.

The initial diacetate polymer has an inherent viscosity of 0.8. In the following table are reported, for various stabilized samples, the weight loss at 200° C. and the inherent viscosity after 30 minutes at 200° C.

Table 4

|  | $K'_{200}\%$ | $K''_{200}\%$ | Inherent viscosity after 30' at 200° C. |
|---|---|---|---|
| Polymer Diacetate Control | 54 | 90 | 0.12 |
| Polymer Diacetate+0.5% BB | 4 | 9 | 0.35 |
| Polymer Diacetate+0.5% DFA | 4 | 10 | 0.45 |
| Polymer Diacetate+0.5% S+0.5% BB | 2.6 | 3.6 | 0.60 |
| Polymer Diacetate+0.5% S+0.5% DFA | 2.8 | 3.5 | 0.65 |
| Polymer Diacetate+0.5% S | 2.3 | 3.5 | 0.66 |

EXAMPLE 3

A polyoxymethylene dihydroxide, prepared as described in Example 1, was acetylated in a hydrocarbon solvent in the presence of acetic anhydride and sodium acetate.

To samples of polyoxymethylene diacetate thus obtained were added, as described in Example 2, 2% BB, 2% DFA and 0.5% S, respectively. The initial inherent viscosity of the polymer diacetate was 1.0.

The results of degradation and of inherent viscosity found after thermal treament at 200° C. are reported in the following table.

Table 5

|  | $K'_{200}\%$ | $K''_{200}\%$ | Inherent viscosity after 30' at 200° C. |
|---|---|---|---|
| Polymer Diacetate control | 60 | 79 | 0.11 |
| Polymer Diacetate+2% BB | 6 | 9 | 0.45 |
| Polymer Diacetate+2% DFA | 5 | 7.8 | 0.77 |
| Polymer Diacetate+0.5% S | 1.8 | 2.7 | 0.80 |

EXAMPLE 4

A polyoxymethylene dihydroxide, prepared by polymerization of anhydrous formaldehyde in an anhydrous aromatic hydrocarbon solvent (xylene), was acetylated as described in Example 3.

To polyoxymethylene diacetate thus obtained was added 0.5% by weight of ventilated solid sulfur.

The mixing of the two products was carried out by means of an agitator.

Other samples were mixed, in analogous manner, with 2% BB and 2% of DFA, respectively. The initial inherent viscosity of the polymer diacetate was 1.5. The results of degradation and the inherent viscosity after thermal treatment at 200° C. are reported in the following table:

Table 6

|  | $K'_{200}\%$ | $K''_{200}\%$ | Inherent viscosity after 30' at 200° C. |
|---|---|---|---|
| Polymer Diacetate+2% BB | 6.9 | 22 | 0.61 |
| Polymer Diacetate+2% DFA | 6 | 18 | 0.96 |
| Polymer Diacetate+0.5% S+2% BB | 4.8 | 9.7 | 0.92 |
| Polymer Diacetate+0.5% S+2% DFA | 2.0 | 3.9 | 0.99 |
| Polymer Diacetate+0.5% S | 3.1 | 3.9 | 0.99 |

EXAMPLE 5

To a polyoxymethylene diacetate prepared as described in Example 3, various stabilizers were added in the manner described in Example 2. The concentrations of the stabilizers used, the results of degradation, and the inherent viscosity after thermal treatment at 200° C. are reported in Table 7. The initial inherent viscosity of the polymer diacetate was 1.15.

Table 7

|  | $K'_{200}\%$ | $K''_{200}\%$ | Inherent viscosity after 30' at 200° C. |
|---|---|---|---|
| Polymer Diacetate+2% BB | 10 | 19 | 0.60 |
| Polymer Diacetate+2% DFA | 8 | 19 | 0.75 |
| Polymer Diacetate+0.5% S | 4 | 8 | 1.0 |

EXAMPLE 6

A sample of polyoxymethylene dihydroxide was obtained by polymerization of $CH_2O$ in aqueous solution in the presence of preformed polymer as solid phase. The synthesis conditions used are described in Italian Patent No. 646,437, filed on January 27, 1961, and consist of contacting at 20° C. an aqueous solution at a pH of about 10, containing 10% by weight of $CH_2O$ and 40% of sodium formate, with solid polyoxymethylene, with a solid/liquid ratio of about 1–2, feeding continuously a 51% aqueous $CH_2O$ solution and sodium formate so as to keep constant the concentration of $CH_2O$ and of sodium formate in the liquid phase, feeding continuously a concentrated NaOH solution so as to keep constant the pH of the liquid phase, and discharging continuously an amount of solid plus liquid in the ratio present in the reaction phase corresponding to the amount of fed substances. The polyoxymethylene thus obtained is dried and acetylated with acetic anhydride at 170° C. with a polymer/anhydride ratio of 1:10.

To the so acetylated polyoxymethylene was added sulfur by the technique described in Example 2.

The initial inherent viscosity of the acetylated polymer was 0.73 and the results after a thermal treatment at 200° C. were as follows:

Table 8

|  | $K'_{200}\%$ | $K''_{200}\%$ | Inherent viscosity after 30′ at 200° C. |
|---|---|---|---|
| Acetylated polymer control | 79 | 99 | 0.20 |
| Acetylated polymer+0.5% S | 2 | 3.5 | 0.60 |

Variations can, of course, be made without departing from the spirit of our invention.

Having thus described our invention, what it is desired to secure and claim is:

1. A thermally stable composition comprising a high molecular weight solid polyoxymethylene containing —$CH_2O$— units recurring in the polymeric chain and containing terminal acyl groups, and sulfur in an amount from about 0.01 to 10% by weight based on the weight of said polyoxymethylene.

2. The composition of claim 1 wherein said polyoxymethylene has an inherent viscosity, as determined in dimethylformamide at 150° C. at a concentration of 0.5% by weight, in excess of 0.4.

3. The composition of claim 1 containing 4,4′-butylidene-bis(6-tertiary butyl-3-methylphenol).

4. The composition of clam 1 containing diphenyl amine.

5. The product of claim 1 in film form.

6. The product of claim 1 in fiber form.

7. The product of claim 1 in sheet form.

References Cited by the Examiner

UNITED STATES PATENTS

| 2,227,985 | 1/1941 | Swan | 260—45.7 |
| 2,920,059 | 1/1960 | MacDonald et al. | 260—67 |
| 3,020,264 | 2/1962 | Behrends et al. | 260—67 |
| 3,050,500 | 8/1962 | Sherwood | 260—45.95 |

LEON J. BERCOVITZ, *Primary Examiner.*